United States Patent Office 3,810,883
Patented May 14, 1974

3,810,883
ADENOSINE 3,5-CYCLIC MONOPHOSPHATE PALMITATES
Charles Giles Smith, Princeton, N.J., assignor to The Upjohn Company, Kalamazoo, Mich.
No Drawing. Filed June 1, 1972, Ser. No. 258,677
Int. Cl. C07d 51/54
U.S. Cl. 260—211.5 R                        2 Claims

ABSTRACT OF THE DISCLOSURE

The two new compounds 2'-O-palmitoyladenosine 3',-5'-cyclic monophosphate and $N^6$,2'-O-dipalmitoyladenosine-3'-5'-cyclic monophosphate are potent inhibitors of adenylate cyclase and are useful for the suppression of hyperhormonal states such as hyperthyroidism and hyperadrenalism.

DETAILED DESCRIPTION OF THE INVENTION

This invention relates to two new adenosine 3',5'-cyclic monophosphate palmitates which are potent inhibitors of adenylate cyclase. These two compounds, 2'-O-palmitoyladenosine 3',5'-cyclic monophosphate and $N^6$,2'-O-dipalmitoyladenosine 3',5'-cyclic monophosphate, are produced by reacting adenosine 3',5'-cyclic monophosphate, preferably in the form of a salt, e.g., a quarternary salt like the triethylammonium salt, with an equimolar amount or an excess, e.g., two or more moles) of palmitic anhydride in a base such as pyridine. An equimolar portion of the anhydride yields the monopalmitate and two or more moles yields the dipalmitate as shown in more detail in the examples.

The two new compounds of this invention, because of their lipophilic properties, in contrast to esters of lower alkanoic acids, inhibit adenylate cyclase and suppress the effects of the hormonal stimulation. They are thus useful for the suppression of hyperhormonal states such as hyperthyroidism or hyperadrenalism, including excessive pathologic hormonal (or other) stimulation of adenylate cyclase as for example, cholera toxin induced intestinal hypersecretion.

These substances may be administered to various animal species, as in dogs or rats, in a dosage of about 50 to 150 mg./kg. daily either orally or subcutaneously. They may be formulated in conventional dosage forms such as tablets or capsules for oral administration or as a suspension or solution in water or other parenterally acceptable vehicle. These dosage forms are prepared according to conventional pharmaceutical practice incorporating the active ingredient along with excipients, binders, lubricants, flavors as required.

The following examples illustrate how the two new compounds of this invention are made.

EXAMPLE 1

A mixture of adenosine 3',5'-cyclic phosphate triethylammonium salt (20 mmoles) and palmitic anhydride (30 g., 61 mmoles) in 150 ml. of pyridine is stirred at 70° for 52 hours with exclusion of moisture. The resulting solution is cooled to room temperature and poured into 300 ml. of ice-water. After 19 hours, the suspension is co-evaporated with ethanol to a creme colored solid. The solid is dissolved in chloroform and 250 g. of silicic acid are added. The resulting suspension is evaporated in vacuo and the resulting solid is added to a silicic acid column (200 g. 4.5 cm. d.; packed in chloroform). The column is washed with 3 liters of chloroform and then chloroform:methanol (9:1) to remove the crude product, 2'-O-palmitoyladenosine 3',5'-cyclic monophosphate. The fractions are evaporated and the resulting solid is dissolved in chloroform (ca. 100 ml.):methanol (ca. 30 ml.). To the solution, 50 g. of ion exchange resin (Dowex 50, H+, 100–200 mesh) are added and the suspension is stirred at room temperature for 30 minutes, filtered and the filtrate is evaporated to a syrup. The syrup is dissolved in a minimum amount of dimethylformamide and 50 g. of silicic acid are added. The suspension is co-evaporated in vacuo with methanol and then coloroform to a solid. A slurry of the solid in chloroform is added to a silicic acid column (200 g., 4.5 cm. d.; packed in chloroform). The column is washed with 2 liters of chloroform, 1 liter of chloroform:methanol (95:5), 1 liter of chloroform:methanol (8:2) to further remove the product. Evaporation in vacuo gives after drying (at 25° C. over $P_2O_5$ in vacuo for 6 days) 2.0 g. of 2'O-palmitoyladenosine 3',-5'-cyclic phosphate. The 2'-O-palmitoyladenosine 3',5'-cyclic phosphate is crystallized from ethanol and dried over $P_2O_5$, in vacuo at room temperature for three days;

$$\lambda_{max}^{methanol}\ 258\ m\mu$$

($\epsilon$ 15,000), no distinct melting point above 230° where decomposition occurs.

EXAMPLE 2

A mixture of adenosine 3',5'-cyclic phosphate triethylammonium salt (20 mmoles) [obtained by pyridine co-evaporation in vacuo of a solution of 6.6 g. (20 mmoles) of adenosine 3',5'-cyclic phosphate in triethylamine] and palmitic anhydride (30 g., 61 mmoles) is stirred at 40° C. for 4½ days with exclusion of moisture. The resulting solution is cooled to room temperature and poured into 600 ml. of ice-water. The aqueous solution is stirred for ca. 12 hours and lyophylized to a foam. The foam is dissolved in a minimum amount of chloroform and added to a silicic acid column (500 g. 6 cm. d.; packed in chloroform). The column is washed with 5 liters of chloroform and then methanol:chloroform (3.97) to remove the impure product, $N^6$,2'-O-dipalmitoyladenosine 3',5'-cyclic monophosphate. Evaporation in vacuo gives a syrup which is dissolved in a minimum amount of chloroform and added to a silicic acid column (200 g., 4.5 cm. d.; packed in chloroform). The column is washed with 3 liters of chloroform:methanol (99:1). Evaporation in vacuo and precipitation of the resulting solid from ethanol-ether gives 4.7 g. of $N^6$, 2'-O-dipalmitoyladenosine 3',5'-cyclic phosphate (dried 12 hours over $P_2O_5$, room temperature in vacuo); M.P. 225-228 (dec.).

What is claimed is:
1. 2'-O-palmitoyladenosine 3',-5'-cyclic monophosphate.
2. $N^6$,2'-O-dipalmitoyladenosine 3',5'-cyclic monophosphate.

References Cited
UNITED STATES PATENTS

| | | | |
|---|---|---|---|
| 3,300,478 | 1/1967 | Wechter | 260—211.5 R |
| 3,712,885 | 1/1973 | Weimann et al. | 260—211.5 R |

JOHNNIE R. BROWN, Primary Examiner

U.S. Cl. X.R.
424—180